US008689032B2

(12) United States Patent
Kurahashi

(10) Patent No.: US 8,689,032 B2
(45) Date of Patent: Apr. 1, 2014

(54) SECONDARY BATTERY CHARGING CONTROL APPARATUS

(75) Inventor: Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 13/163,479

(22) Filed: Jun. 17, 2011

(65) Prior Publication Data

US 2011/0314319 A1 Dec. 22, 2011

(30) Foreign Application Priority Data

Jun. 21, 2010 (JP) ................................. 2010-140848

(51) Int. Cl.
*G06F 1/26* (2006.01)
(52) U.S. Cl.
USPC .......................................... 713/340; 713/300
(58) Field of Classification Search
None
See application file for complete search history.

(56) References Cited

U.S. PATENT DOCUMENTS

| 5,930,192 | A * | 7/1999 | Ishikawa ........................ 365/229 |
| 7,933,695 | B2 * | 4/2011 | Yamaguchi ........................ 701/22 |
| 2003/0178968 | A1 * | 9/2003 | Sakakibara et al. .......... 320/110 |

FOREIGN PATENT DOCUMENTS

| CN | 101377541 A | 3/2009 |
| JP | 09-214623 A | 8/1997 |
| JP | 2002-244773 A | 8/2002 |
| JP | 2009-201171 A | 9/2009 |
| JP | 2009-252208 A | 10/2009 |

* cited by examiner

*Primary Examiner* — Dennis M Butler
(74) *Attorney, Agent, or Firm* — Canon USA Inc. IP Division

(57) ABSTRACT

An information processing apparatus capable of installing a plurality of storage units includes a first supply unit configured to supply electric power to the plurality of storage units, a second supply unit configured to supply electric power to the plurality of storage units, when the first supply unit stops supplying electric power to the plurality of storage units, a charging unit configured to charge the second supply unit, a measurement unit configured to measure a time during which the second supply unit supplies electric power to the plurality of storage units, a detection unit configured to detect a number of the storage units installed on the information processing apparatus, a determination unit configured to determine a time during which the second supply unit should be charged, based on the time which has been measured by the measurement unit and the number of units which has been detected by the detection unit, and a control unit configured to perform control that the charging unit charges the second supply unit for a period of the time which has been determined by the determination unit.

6 Claims, 11 Drawing Sheets

FIG.4

| | | | DEVICE ELECTRIC POWER (REQUIRED CHARGING TIME) | |
|---|---|---|---|---|
| | DRAM (IN CASE OF MAX. 12 PCS) | 4 PCS | 8 PCS | 12 PCS |
| | OTHER MEDIUM | 1 PCS | 1 PCS | 1 PCS |
| | TOTAL POWER CONSUMPTION [mAh]/HOUR [h] | 80 mA | 150 mA | 250 mA |
| DISCHARGING TIME | 1 ~ 30 MIN | 16 MIN | 30 MIN | 50 MIN |
| | 31 MIN ~ 60 MIN | 32 MIN | 60 MIN | 100 MIN |
| | 61 MIN ~ 90 MIN | 49 MIN | 90 MIN | 150 MIN |
| | 91 MIN ~ 120 MIN | 64 MIN | 120 MIN | 200 MIN |
| | 121 MIN ~ 150 MIN | 81 MIN | 150 MIN | 251 MIN |
| | 151 MIN ~ 180 MIN | 97 MIN | 180 MIN | 301 MIN |
| | ⋮ | | ⋮ | |
| | 360 MIN | 194 MIN | 360 MIN | 601 MIN |

[CHARGING CURRENT: 150mA]

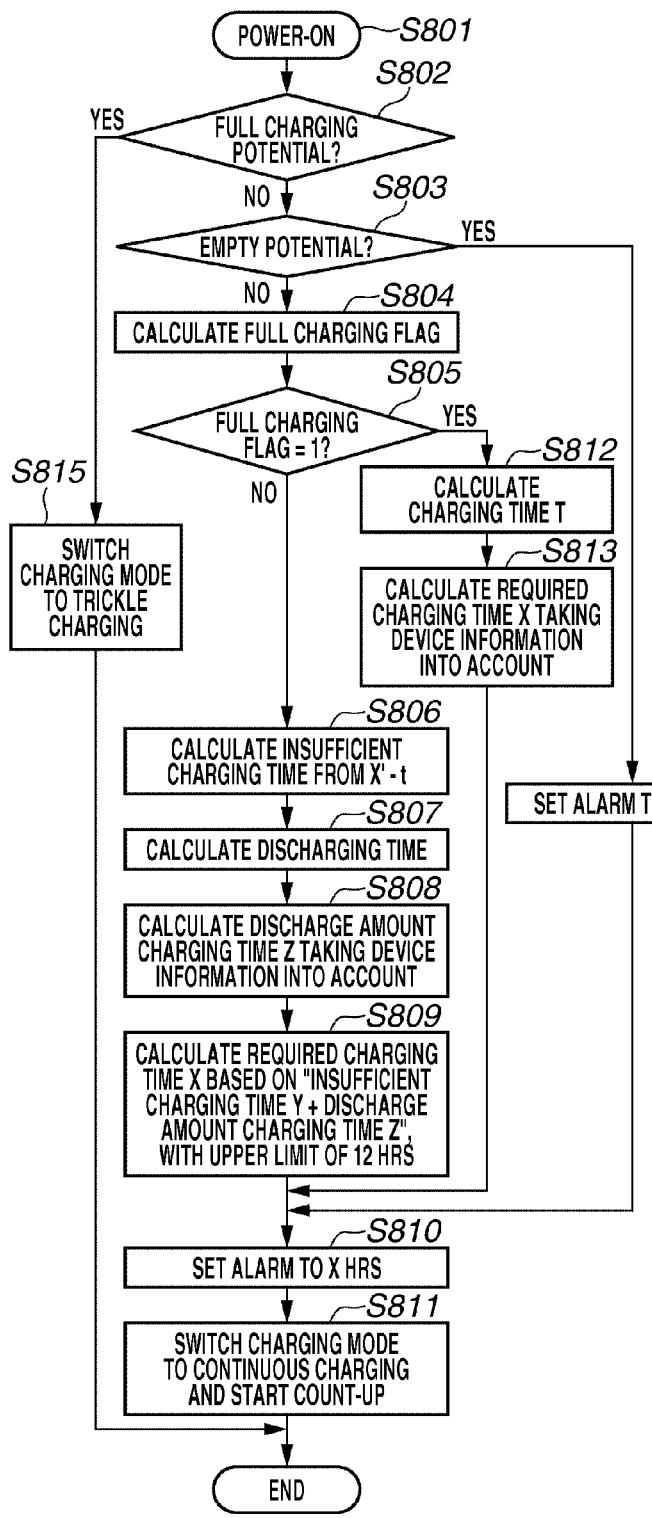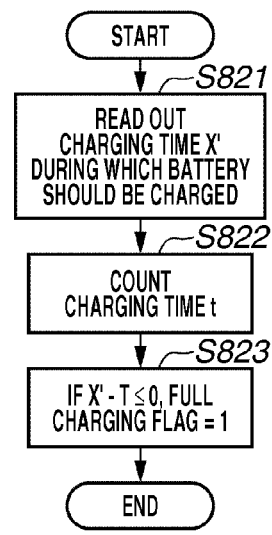

SECONDARY BATTERY CHARGING CONTROL APPARATUS

BACKGROUND OF THE INVENTION

1. Field of the Invention

The present invention relates to a technology for preventing an overcharge of a secondary battery, and more particularly, to a charging control of the secondary battery as a backup power source, incorporated into an apparatus which can shift to a power-saving mode.

2. Description of the Related Art

A secondary battery such as a lithium battery or nickel-hydrogen battery is used as a power source for temporary backup purpose, if an external power source supplied to an apparatus (e.g., commercial power source (AC power source) as a major power supply source) is cut off. It is supposed that a power source is supplied from the secondary battery so that, for example, image information of a facsimile or the like (facsimile-received image data) stored in a volatile memory such as a dynamic random-access memory (DRAM) incorporated into the apparatus, can continue to be retained even when the power source is unexpectedly cut off.

Since such the secondary battery for backup purposes is provided, in many cases, in preparation for a sporadic short power-off such as power outage, it is in a charged state for most of the time. However, in the event that the secondary battery falls into an "overcharged state", more specifically, the secondary battery still continues to charge, even when it has reached a fully-charged state, this may cause considerable deterioration of the battery, and significantly affect a service life of the battery.

In such a case, conventionally, it has been proposed, when a fully-charged state of the battery is detected, to switch to a method for charging the battery after that using an electric current in an amount which compensates for only a self-discharge of the secondary battery (hereinafter, called a trickle charging).

Several full-charge detection techniques have been already discussed. Firstly, a full-charge detection method based on voltage is available. The full-charge detection method is a method for detecting the full-charge from the fact that a battery potential has reached a predetermined voltage, and then switching to a trickle charging.

However, the battery potential significantly varies in values depending on an ambient temperature, and thus the battery potential cannot be controlled in some cases by a simplified electric circuit (circuit without temperature sensor). As a control method which complements the above technique, a method is proposed that switches to the trickle charging, if an elapsed time from the start of charging reaches a predefined time. Generally, control of this method is performed such that normal charging is executed for a given length of time at the time of power-on, and thereafter, the normal charging shifts to trickle charging when a predetermined length of time has elapsed or full-charge is detected (charging is not executed depending on temperature). The length of time of the normal charging is generally about 12 to 16 hours.

On the other hand, since it is supposed that power is continuously supplied to the apparatus, an apparatus as described above may shift to the "power-saving mode" to reduce power consumption of the apparatus for a period of time during which a user is not using the apparatus.

"Power-saving mode" is a standby mode in which electric power supply except that for minimum required circuits is cut off, in many cases, and power consumption of the entire apparatus is suppressed. In a multifunction image forming apparatus provided with, for example, a facsimile function, even in the nighttime during which copying and printing are not performed, power needs to be continuously supplied in a case of a FAX reception. In recent years, in the power-saving mode, suppressing power consumption during standby has been implemented, in which power is supplied such that particularly only a signal reception portion, rather than the entire facsimile function, effectively operates, and power supply to a circuit other than that portion is cut off. The same holds for the print function.

In a case of an apparatus provided with the "power-saving mode" described above as the standby mode, even a power source of a central processing unit (CPU) is cut off which controls a timer or the like in order to suppress power consumption as much as possible, which has become a mainstream. In the power-saving mode, since even the power source of the CPU is cut off, the apparatus is generally set to a trickle-charging state rather than a normal-charging state, from a viewpoint of safety.

In the apparatus provided with the power-saving mode as described above, power source is often connected at all times. The secondary battery provided in such apparatus is subjected to the normal charging for a total of about 12 to 16 hours by a timer function, if the power is not turned off/on, and enters into the full-charge at a time point when the predetermined time is reached, and thereafter, the full-charge will be maintained by the trickle charging.

However, depending on way of use by the user, the power may be irregularly turned off/on, or the apparatus may be set at a place where power outages frequently occur, therefore, such cases should be sufficiently taken into consideration. Also, if a temperature condition is bad, the full-charge detection may fail. When the normal charging for 12 to 16 hours described above is executed to a battery, each time the power is turned off/on or initialization is executed due to power outage, under such a condition, the battery will be charged again before the battery is completely discharged. In other words, a charging amount of the battery will significantly go above a discharging amount of the battery, and extreme overcharge of the battery will be repeated, which might greatly affect a lifetime of the battery.

In order to solve this problem, a method for calculating a length of time from power shutoff to power resumption, by detecting a power-off signal and performing time stamp of the time-of-day, and for determining a next charging amount depending on its result is discussed in Japanese Patent Application Laid-Open No. 2009-201171.

However, many image forming apparatuses, after a power switch (hereinafter, a power SW) is turned off and then the time stamp is pressed, are not supposed to stop power feeding to the image forming apparatus. This is because a general power SW is used to directly connect/disconnect an AC line, and the power feeding to the CPU will be stopped concurrently with turn-off of the power SW.

Further, the CPU enters into a reset state, when the power source is lowered to a predetermined voltage, for the purpose of stabilization of the system, which makes it difficult to generate a time difference between turn-off of the power SW and stoppage of power feeding to the CPU.

Hence, there is a problem that in order to generate the time difference since the power SW is turned off until the power feeding to the CPU is stopped as described above, it will in turn invite complex apparatus configuration and increase in costs.

In a method in which the CPU operates only by detecting the power SW, the CPU does not operate at the time of plug-in or -off of a receptacle or turn-off/on of SW on a table tap, or when a power outage occurs, and the apparatus cannot respond to such cases.

If the power SW is turned off of or the power outage occurs during the power-saving mode in which electric power supply to the CPU is stopped, the above-described method cannot deal with such cases. Alternatively, it is also possible to provide a control circuit (e.g., CPU) to which power is supplied even in the power-saving mode to prevent secondary battery overcharge, but there is a problem that this configuration reduces efficiency of power-saving, and increase the costs of the entire apparatus.

SUMMARY OF THE INVENTION

The present invention provides a mechanism for calculating, without involving increase in costs, and accurately even when a charging target of a secondary battery is changed, a charging time of the secondary battery incorporated as a backup power source into an apparatus which intends to shift to a power-saving mode to suppress even power consumption of a control system, and preventing an overcharge of the secondary battery.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a table (correspondence table) for obtaining a required charging time from a number of devices and a discharging time in the present invention.

FIGS. 10A and 10B are flowcharts illustrating a control during power-on in a second exemplary embodiment.

DESCRIPTION OF THE EMBODIMENTS

Various exemplary embodiments, features, and aspects of the invention will be described in detail below with reference to the drawings.

In a first exemplary embodiment of the present invention, a suitable example is illustrated, in a case where a secondary battery is used as a backup power source of a volatile memory equipped within the apparatus. Concrete examples of the apparatus illustrated in the present exemplary embodiment include a facsimile apparatus or a multifunction peripheral/multifunction printer (MFP) or a digital multifunction peripheral (hereinafter, multifunction peripheral). Of the concrete examples of the apparatus, particularly, it is suitable to apply the present invention to the facsimile apparatus or the MFP, the multifunction peripheral which is not equipped with a non-volatile storage apparatus (e.g., hard disk drive or semiconductor disk drive).

Figure 1:
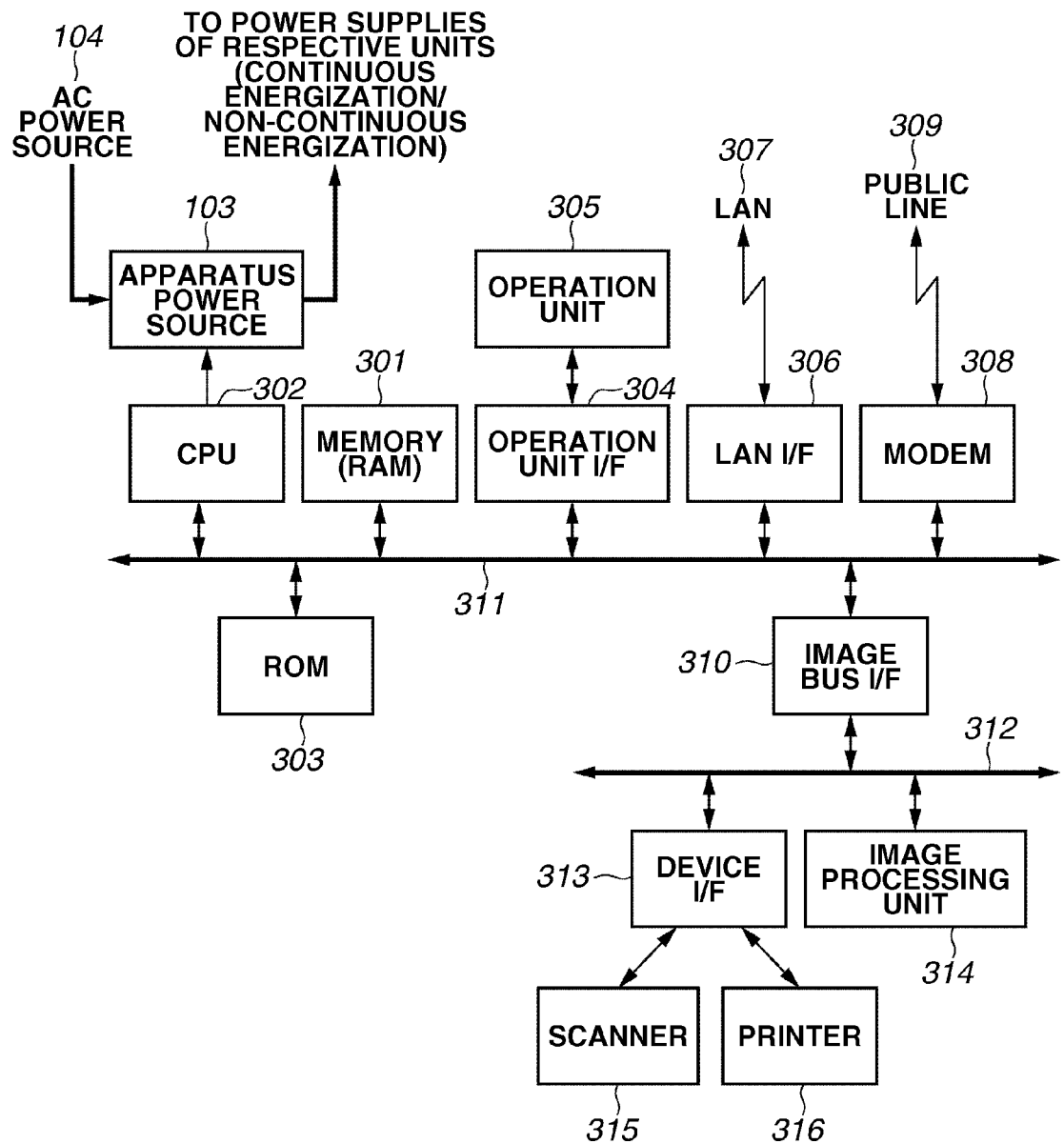
FIG. 1 is a block diagram illustrating an example of system configuration of an apparatus to which a secondary battery charging control apparatus according to the present invention can be applied.

FIG. 1 is a block diagram illustrating an example of system configuration of the apparatus to which the secondary battery charging control apparatus according to the present invention can be applied.

In FIG. 1, a CPU 302 functions as a controller that controls the entire system. A memory (RAM) 301 is a system work memory for operation of the CPU 302, and is also used as an image memory for temporarily storing image data. In the present exemplary embodiment, the memory 301 becomes a power source backup target. A power source configuration of the present apparatus will be described below.

A read-only memory (ROM) 303 functions as a boot ROM, and a boot program of the multifunction peripheral according to the present exemplary embodiment is stored therein. An operation unit interface (I/F) 304 functions as an interface with an operation unit (UI) 305, and outputs image data to be displayed on an operation unit 305 to the operation unit 305. The operation unit I/F 304 serves to deliver information which a user of the multifunction peripheral according to the present exemplary embodiment has input from the operation unit 30, to the CPU 302.

A network interface (LAN I/F) 306 is connected to a local area network (LAN) 307, and performs input and output of the information. A modem 308 is connected to a public line 309, and performs input and output of the information. The above devices are arranged on a system bus 311, and exchange the information via a system bus 311.

An image bus I/F 310 is a bus bridge that connects the system bus 311 and an image bus 312 which transfers image data at high speeds, and converts data structure.

The image bus 312 is composed of a high-speed bus such as a peripheral component interconnect (PCI) bus. On the image bus 312 devices described below are arranged. A device I/F unit 313 connects a scanner 315 serving as an image input and output device or a printer 316 to the image bus 312, and performs conversion of synchronous system/asynchronous system of the image data. An image processing unit 314 performs correction, processing, edition on input image data, and performs correction of printer, resolution conversion and the like on print output image data.

An apparatus power source 103 performs conversion (e.g., alternating current/direct current (AC/DC) conversion, DC/DC conversion) of electric power supplied from an external power source (AC power source 104) such as a commercial power source, and generates electric power to be supplied to the inside of the apparatus.

When FAX is received by the present apparatus, the received FAX images are temporarily stored in the RAM 301. In the present exemplary embodiment, a memory reception is performed according to instruction of the user, and the FAX is received when recording paper runs out, as examples. If the received FAX images are accumulated in the memory, the received FAX images are retained being stored in the RAM 301 without being output onto the record paper. The same is true in a reception method for outputting an image onto the recording paper in designated timing.

If the AC power source supplied to the present apparatus is cut off due to power outage or the like, while the received images are being retained in the RAM 301 as described above, there is a possibility that the information stored in the RAM 301 serving as a volatile memory might be erased. Thus, the present apparatus backs up a self-refreshing state of the RAM 301 by the secondary battery (as will be described below) in preparation for the power outage or the like.

When power returns, while the RAM 301 is executing the self-refreshing by the secondary battery power, the CPU 302 determines whether the RAM 301 has been backed up. If the RAM 301 has been backed up, the information stored in the RAM 301 will be handled as the received FAX images.

Figure 2:
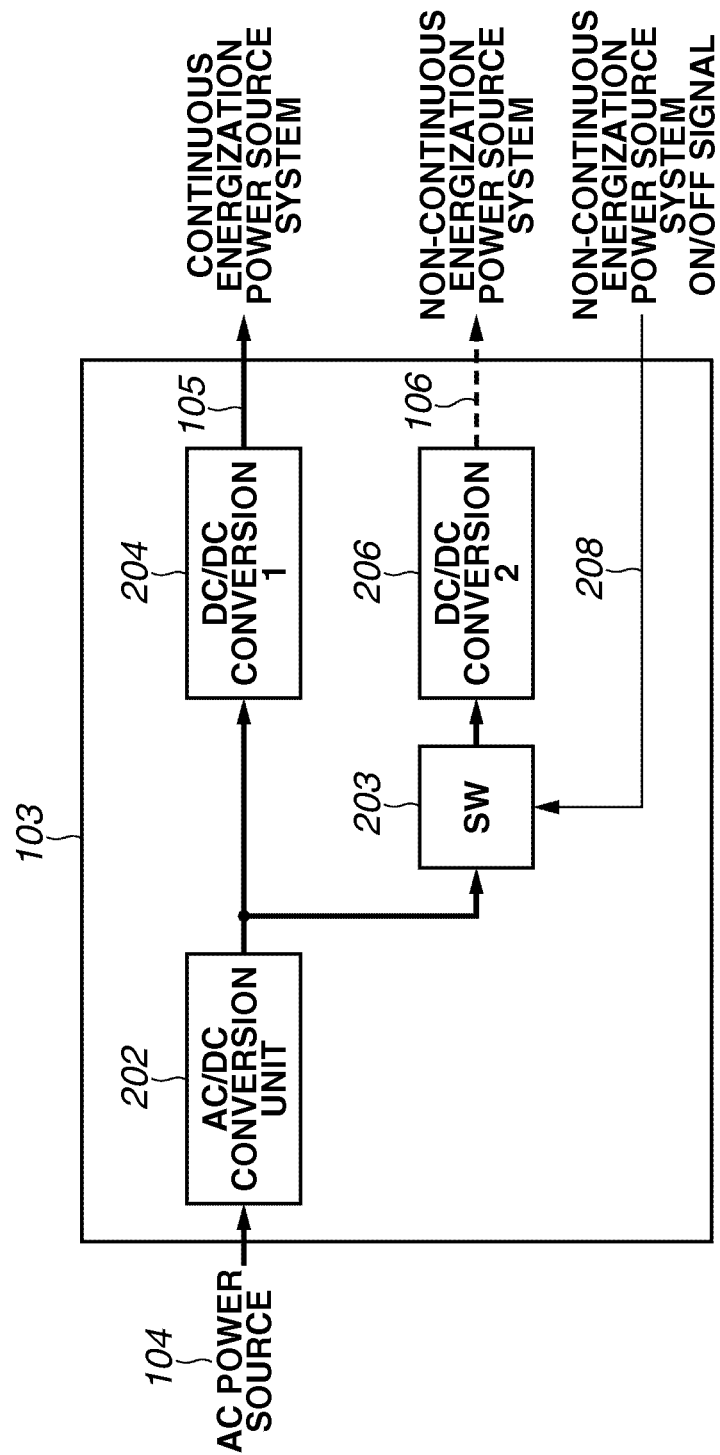
FIG. 2 is a block diagram illustrating an example of configuration of an apparatus power source 103 illustrated in FIG. 1.

FIG. 2 is a block diagram illustrating an example of a configuration of the apparatus power source 103 illustrated in FIG. 1. In FIG. 2, an AC/DC conversion unit 202 performs conversion (AC/DC conversion, voltage conversion) of electric power input from the AC power source 104 such as a commercial power source. The electric power converted to DC is branched into two systems.

The one power is sent to DC/DC conversion1 204 as a continuous energization system. The DC/DC conversion1 204 performs voltage conversion adapted to respective circuits within the apparatus, on electric power input from the AC/DC conversion unit 202 to generate a continuous energization power source system 105.

The other power is sent to a DC/DC conversion2 206 through a switch (SW) 203, as a non-continuous energization system. The DC/DC conversion2 206 performs voltage conversion adapted to respective circuits which use a non-continuous energization power source within the apparatus, on electric power input via the switch (SW) 203 from the AC/DC conversion unit 202 to generate a non-continuous energization power source system 106.

Figure 5:
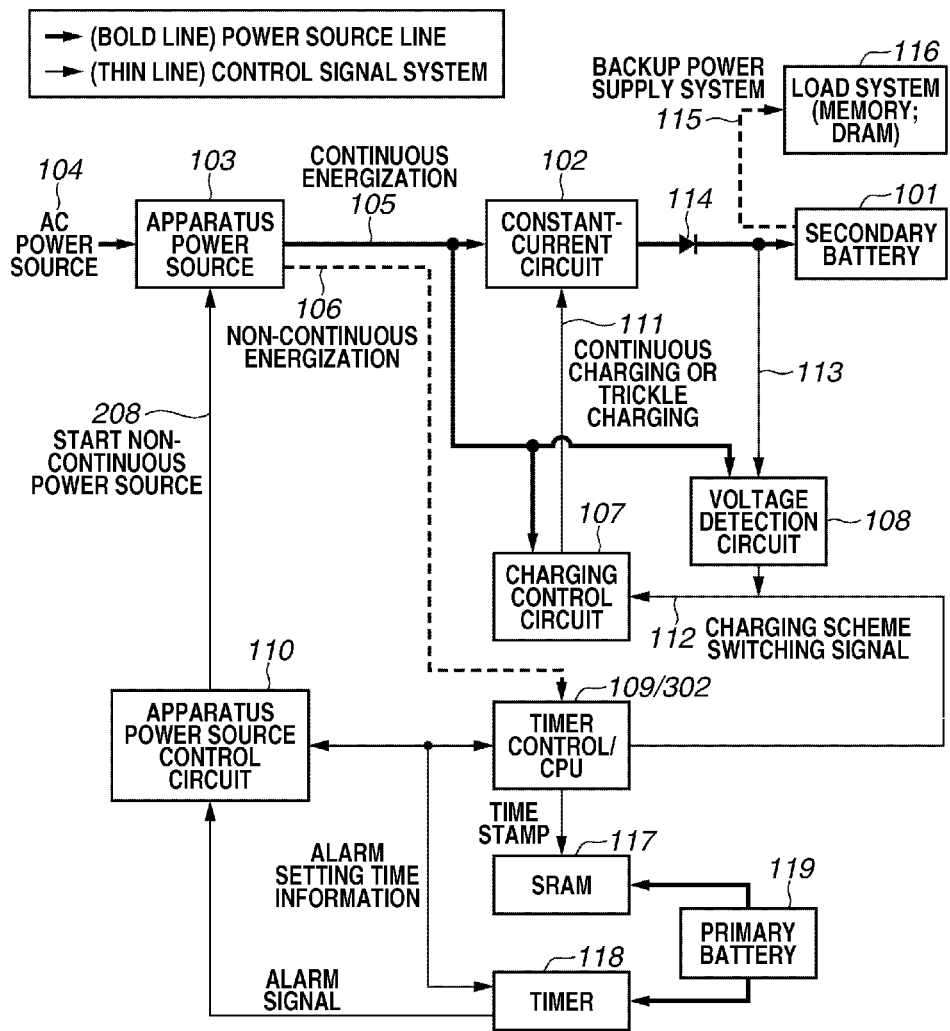
FIG. 5 illustrates an example of a charging circuit (secondary battery charging control circuit) which charges the secondary battery incorporated into the apparatus illustrated in FIG. 1.

Opening/closing of the SW 203 is controlled by ON/OFF signal 208 of the non-continuous energization power source system sent from an apparatus power source control circuit 110 (as will be described below in FIG. 5). When shifting to the "power-saving mode", a control signal for turning the non-continuous energization power source system 106 off is input from the apparatus power source control circuit 110 (FIG. 5) into the SW 203. The SW 203 is turned off in response to the signal and electric power supply after the SW 203 is cut off. As a result, power consumption of the apparatus during the power-saving mode can be suppressed.

Figure 3:
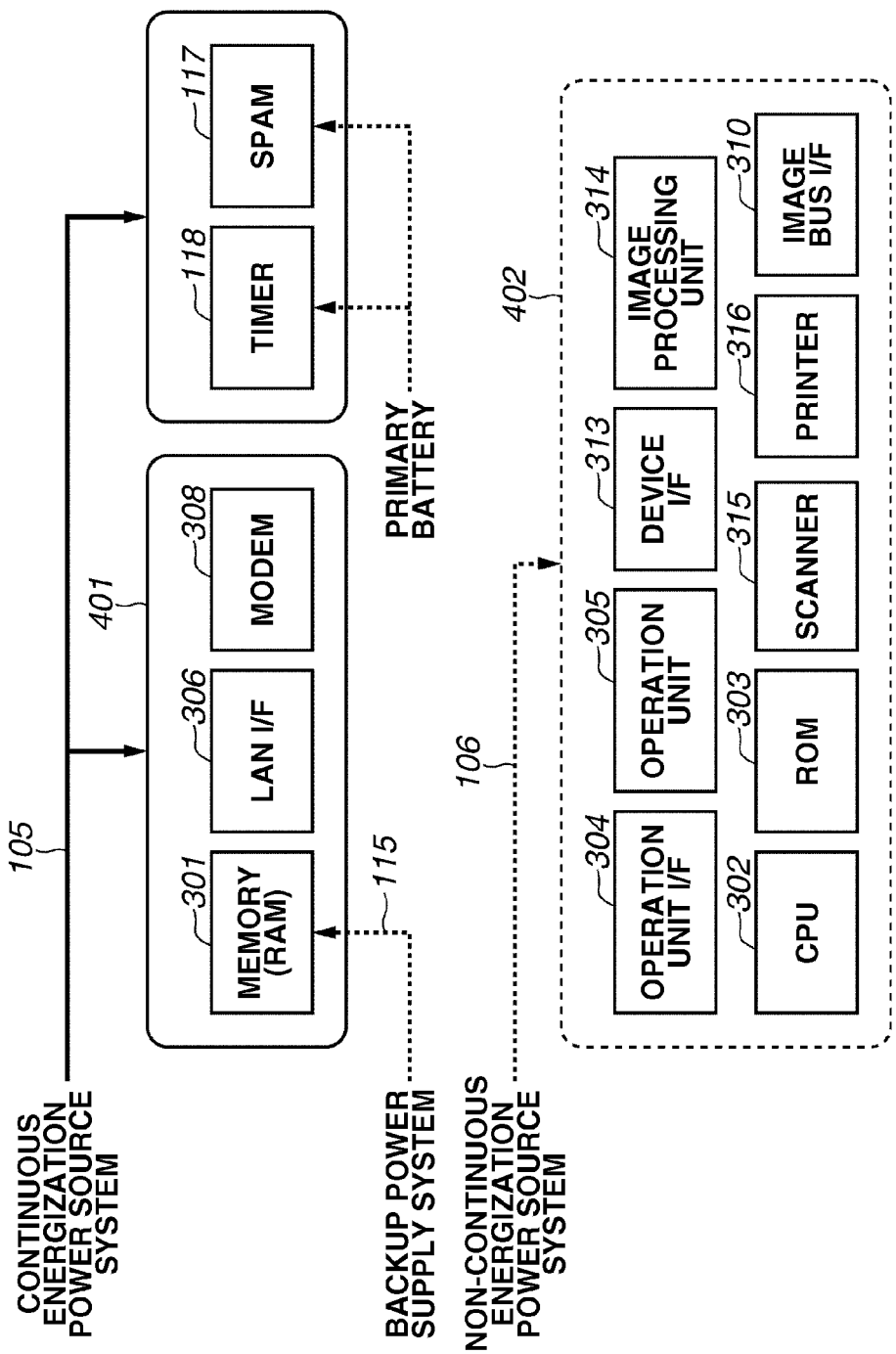
FIG. 3 illustrates a suitable power source system configuration of the apparatus illustrated in FIG. 1.

Subsequently, a suitable power source system configuration of the apparatus illustrated in FIG. 1 will be described with reference to FIG. 3. FIG. 3 illustrates a suitable power source system configuration of the apparatus illustrated in FIG. 1. A block 401 surrounded by bold solid line in FIG. 3 receives electric power supply from the continuous energization power source system 105. On the other hand, a block 402 surrounded by bold dashed lines in FIG. 3 receives electric power supply from the non-continuous energization power source system 106. To any block, a power source which has been subjected to voltage conversion suitable for each block is supplied.

As described above, the RAM 301 which stores therein the received FAX images of the users, and the LAN I/F 306 and the modem 308 for detecting packets from a network, or incoming calls from a public line network, receive electric power supply of the continuous energization power source system 105.

Furthermore, the RAM 301 receives backup electric power from the backup power supply system 115 (the secondary battery 101 illustrated in FIG. 5 described below), and is supplied with power from the backup power supply system 115, even when electric power supply from the AC power source 104 is cut off.

On the other hand, the block 402 which does not require electric power supply during standby when the users are not directly using it, receives electric power supply from the non-continuous energization power source system 106. For example, the scanner (image reading apparatus) 315 is cut off from electric power supply, when the user does not perform copying or scanning. Also, a printer 316 which requires a large amount of current for development of images, is cut off from electric power supply during standby, that is, other than when necessary.

In addition, in the apparatus according to the present exemplary embodiment, electric power supply to the CPU 302 or the like serving as a control device is stopped aiming at additional power-saving. In a state where the electric power supply to the CPU 302 is stopped, the electric power supply to the CPU 302 is caused to return, when as a return factor, for example, the FAX is received or a power-on command is executed by the user (depress power switch), and thereafter, electric power supply to respective blocks are resumed according to a command from the CPU 302.

Usually, in a state where the power source supply to the CPU 302 is stopped, times of day counted by a timer cannot be recorded in the SRAM 117 (time stamp). However, in the present exemplary embodiment, by using an alarm function built in the timer 118, the time stamp can be accurately recorded in the SRAM 117 even while the CPU 302 is being stopped. Hereinbelow, description will be given in detail.

The timer 118, in addition to a clock function for notifying time of day, is provided with an alarm function for outputting an alarm signal to the outside, at a predetermined time-of-day, or when a predetermined length of time, which the CPU 302 defines in advance, has elapsed. The electric power supply returns to the CPU 302 as a result of the alarm signal acting as a trigger, and electric power supply to each block is resumed. Thereafter, the CPU 302 reads out time of day (time-of-day information) from the timer 118, and records the time of day in the non-volatile SRAM 117 connected to a primary battery (a primary battery 119 illustrated in FIG. 5 described below). Accordingly, in a state where power is on even when electric power feeding to the CPU 302 is not performed, the CPU 302 returns to operation temporarily, and the CPU 302 can accurately record a length of time during which power is on.

Thereafter, when the AC power source 104 ceases to be supplied, for example, in a case of power-off, the CPU 302 becomes unable to return to operation temporarily as described above, and the time stamp described above cannot be affixed. Next, after the power is turned on, the CPU 302 gets access to the timer 118, and grasps a time-of-day of the charging start of the secondary battery 101. Then, the CPU 302 compares a time-of-day of the charging start of the secondary battery 101 with a time-of-day of the time stamp which was recorded last at previous time, and can determine a length of time during which the power was off. In other words, the CPU 302 can grasp a length of time during which the secondary battery 101 discharged. In the present exemplary embodiment, the CPU 302 calculates, in addition to a discharging time of the secondary battery 101, an amount of discharged electric charges of the secondary battery 101, in consideration of the power consumption per unit time of a device which is supplied with power from the secondary battery 101. The power consumption per unit time of the device which is supplied with power from the above-described secondary battery 101 is acquired based on a correspondence table illustrated in FIG. 4 described below.

The timer 118 and the SRAM 117, if the continuous energization power source system 105 is not supplied due to power outage or power-off, is supplied with power by the primary battery 119. Therefore, the time stamp stored in the SRAM 117 will never be erased, as a result of discontinuance of electric power supply of the continuous energization power source system 105. On the other hand, if the continuous energization power source system 105 is supplied, the timer 118 and the SRAM 117 are fed with power from the continuous energization power source system 105.

In the present exemplary embodiment, as the facsimile function and the printer function and other functions are added, necessary memory capacity may increase, and a plurality of memory structures may be needed when a dual inline memory module (DIMM) memory for expansion is added. If the secondary battery has entered into a discharging state due to power outage or power SW off or the like, the discharging amount varies greatly depending on configuration of connected memories.

The present invention has a feature that a discharging amount is accurately calculated, by obtaining a product of the power consumption per unit time calculated from the configuration of a device to which power is supplied by the secondary battery, and a length of power-off time, and a required charging time is calculated from the calculated discharging amount and charging current value. The information of the device (configuration information of loads backed up by the secondary battery) is stored in the non-volatile memory configured on the DIMM memory, and can be acquired by reading out from the non-volatile memory configured on the DIMM memory by the CPU 302. The CPU 302 may read out the information of the device from the non-volatile memory on the DIMM memory, at the time of activation to store it in the RAM 301, and may read it out as may be necessary. In the loads to which power is supplied by the secondary battery, LED (LED for indicating that backup operation is in progress by the secondary battery) may be included, in addition to a memory such as DRAM. In this case, a portion of device information such as a number of the LEDs may be stored in the ROM 303.

By performing the above calculation of a required charging time every time power is turned on, the required charging time may be obtained. In the present exemplary embodiment, however, the required charging time is obtained using the table illustrated in FIG. 4. Hereinbelow, the calculation will be described in detail. In the present exemplary embodiment, power consumptions per unit time of all patterns of configuration which devices, which are supplied with power by the secondary battery, can take are calculated in advance. Furthermore, a discharging amount is calculated by obtaining a product of the power consumption and the discharging time, for each combination of calculated power consumptions and supposed discharging time zones. Furthermore, a required charging time is calculated from the calculated discharging amount and the charging current value, and the table illustrated in FIG. 4 is created from the result, and is stored in a correspondence table storage unit within the ROM 303. Then, the CPU 302, when power is turned on, reads out information of the device from the non-volatile memory. Furthermore, the CPU 302 reads out a required charging time corresponding to the information of the device and the discharging time (elapse of time from the previous power-off) from the table illustrated in FIG. 4, and performs charging of the secondary battery.

FIG. 4 illustrates a table (correspondence table) for obtaining a required charging time from a number of devices and a discharging time in the present invention. The column for "device electric power" shows a power consumption per unit time consumed for each configuration (total power consumption [mAh]/hour [h]), in other words, a consumed current [mA] for each device configuration, with respect to all configurations which a load system (device) can take. The secondary battery 101 supplies a backup electric power to the load system (device). In the example in FIG. 4, as a configuration of the load system (device), in a case of a configuration in which 4 pieces of DRAMs and one other medium (e.g., LED) are connected, the table illustrates that a total power consumption per unit time is 80 [mA]. Further, in a case of a configuration in which 8 pieces of DRAMs and 1 piece of other medium are connected, the table illustrates that a total power consumption per unit time is 150 [mA]. In a case of a configuration in which 12 pieces of DRAMs and 1 piece of other medium are connected, the table illustrates that a total power consumption per unit time is 250 [mA].

The column for "discharging time" shows a length of power-off time (discharging time of the secondary battery 101) [min]. In the example in FIG. 4, the table illustrates 1 to 30 min, 31 to 60 min, 61 to 90 min, 91 to 120 min, 121 to 150 min, 151 to 180 min, . . . , and 360 min, as discharging time.

Furthermore, in the column of "required charging time" corresponding to the column (column) of "device electric power" and the column (row) of "discharging time", a required charging time derived from the device electric power and the discharging time is shown. For example, in a case of a configuration in which "4 pieces" of DRAMs and "1 piece" of other medium are connected, and a discharging time is "1 to 30 min", the table shows that a required charging time is "16 min". In a case of a configuration in which "8 pieces" of DRAMs and "1 piece" of other medium are connected, and a discharging time is "1 to 30 min", the table shows that a required charging time is "30 min". In a case of a configuration in which "12 pieces" of DRAMs and "1 piece" of other medium are connected, and a discharging time is "1 to 30 min", the table shows that a required charging time is "50 min".

Hereinbelow, a method for deriving a required charging time from a device electric power and a discharging time, and creating the table illustrated in FIG. 4 will be described more specifically. In a case where the load system (device) has a configuration in which 4 pieces of DRAMs and 1 piece of other medium are connected, the device electric power (consumed electric current of device) becomes, for example, "80 [mA]". In a case where a discharging time is "31 min to 60 min", a discharge capacity [mAh] of the device is calculated as "80 [mA]×(31/60) [h] to 80 [mA]×(60/60) [h]". Then, in a case where the charging current is "150 [mA]", a next charging time (required charging time) [h] becomes "80 [mA]×(60/60) [h]/150 [mA] 0.53 [h]", and thus it can be determined that "32 min" is sufficient. Therefore, "32 min" is written in the column of "required charging time" corresponding to the above-described condition, in other words, in the column "required charging time" corresponding to the column (column) of the device for "4 pieces of DRAMs and 1 piece of other medium" (device electric power: 150 [mA]) and the column (row) of discharging time "31 min to 60 min".

In a case of a configuration of 8 pieces of DRAMs and 1 piece of other medium, a device electric power becomes "150 [mA]". In a case where a discharging time is "31 min to 60 min", a discharge capacity [mAh] is calculated as "150

[mA]×(31/60) [h] to 150 [mA]×(60/60) [h]". Then, in a case where a charging current is "150 [mA]", a next charging time (required charging time) [h] becomes "150 [mA]×(60/60) [h]/150 [mA]=1 [h]", and thus it can be determined that "60 min" is sufficient. Then, "60 min" is written in the column of "required charging time" corresponding to the above-described condition, in other words, in the column of "required charging time" corresponding to the column (column) of the device of "8 pieces of DRAMs and 1 piece of other medium" (device electric power: 150 [mA]), and the column (row) of discharging time "31 min to 60 min".

In a case of configuration of 12 pieces of DRAMs and 1 piece of other medium, a device electric power becomes "250 [mA]", and in a case where a discharging time is "31 min to 60 min", a required charging time [h] is calculated as "250 [mA]×(31/60) [h] to 250 [mA]×(60/60) [h]". Then, in a case where a charging current is "150 [mA]", a next charging time (required charging time) [h] becomes "250 [mA]×(60/60) [h]/150 [mA] 1.66 [h]", and thus it can be determined that "100 min" is sufficient. Then, "100 min" is written in the column of the "required charging time" corresponding to the above-described condition, in other words, in the column of "required charging time" corresponding to the column (column) of the device of "12 pieces of DRAMs and 1 piece of other medium" (device electric power: 150 [mA]), and the column (row) of discharging time "31 min to 60 min".

By the similar method, the correspondence table (table) with all columns being filled is created in advance, and is kept stored in the ROM 303 or the like. The table (correspondence table) illustrated in FIG. 4 is one example, and the tables become different from each other depending on charging current or alarm setting, configuration patterns of device or the like.

The apparatus according to the present invention determines a required charging time (a length of time during which the battery should be normally charged when power is turned on) using the correspondence table from the device configuration (device electric power), and the discharging time, and executes charging control.

By such configuration, even in a case where memories are added to the apparatus on the market due to an expansion of multi function or the like, for example, from 4 pieces to 8 pieces or 12 pieces, such addition can be dealt with using the table FIG. 4. More specifically, in a case of a configuration in which 4 pieces of DRAMs are connected, and a discharging time is "31 min to 60 min", the required charging time is "32 min". However, when a configuration is changed to the one in which 8 pieces or 12 pieces of the DRAMs are connected, it is necessary to respond the case by changing even the required charging time. Even when an apparatus configuration is thus changed, in a case where the discharging time is "31 min to 60 min", it is possible to deal with the change by setting the required charging time to "60 min" or "100 min".

In a case where 8 pieces of DRAMs and 1 piece of other medium are connected, the CPU 302 reads out as information of the device that 8 pieces of the DRAMs are connected, from the non-volatile memory on the DIMM memory, and reads out from the ROM 303 that 1 piece of other medium (LED) is connected.

Hereinbelow, a circuit configuration according to the exemplary embodiment of the secondary battery charging circuit according to the present invention will be described with reference to FIG. 5. FIG. 5 illustrates an example of a charging circuit (secondary battery charging control circuit), for charging the secondary battery incorporated into the apparatus illustrated in FIG. 1. Bold lines in FIG. 5 indicate power source system, and thin lines indicate transmission of control signals.

The secondary battery 101 is charged by power supplied from the AC power source 104 such as the commercial power source. The apparatus power source 103 generates a power source which performs AC/DC conversion, DC/DC conversion or the like, on electric powers from the AC power source 104 and supplies them to the inside of the apparatus. The details of the apparatus power source 103 have been described in FIG. 2. The apparatus power source 103 generates the continuous energization power source system 105 and the non-continuous energization power source system 106, as power sources supplied to the inside of the above-described apparatus.

The non-continuous energization power source system 106 is a power source system which is cut off when a mode is shifted to the "power-saving mode (may also be referred to as energy-saving mode/energy save mode)" for reducing power consumption while the apparatus is in standby state. Upon receiving the non-continuous energization power source system on/off signal 208 (FIG. 2) from the apparatus power source control circuit 110, the apparatus power source 103, when shifting to the "power-saving mode", cuts off the non-continuous energization power source system 106 in the apparatus power source 103.

The continuous energization power source system 105 is a power source system which supplies power to necessary electric circuits for enabling necessary minimum function even when a mode is shifted to the "power-saving mode". Therefore, the continuous energization power source system 105 is never powered off, even when a mode is shifted to the "power-saving mode".

The continuous energization power source system 105 is used for charging of the secondary battery 101. Charging is performed at a constant current on the secondary battery 101 by the constant-current circuit 102 which has received the continuous energization power source system 105. The constant-current circuit 102 also operates based on the continuous energization power source system 105. The constant-current circuit 102 switches between a continuous charging which performs continuously charging to increase a charging amount by receiving the charging control signal 111, and a trickle charging which performs charging to compensate for only a self-discharge of the secondary battery 101. The trickle charging will be described with reference to FIG. 6 described below.

A voltage detection circuit 108 always monitors a battery voltage 113 of the secondary battery. Therefore, the voltage detection circuit 108 also operates based on the continuous energization power source system 105. The voltage detection circuit 108, if the battery voltage 113 exceeds a predetermined voltage (fully-charged state), outputs a charging scheme switching signal 112 to a charging control circuit 107. If the charging scheme switching signal 112 is detected, the charging control circuit 107 performs control to switch to the trickle charging described above in response to the charging control signal 111.

Further, the voltage detection circuit 108 has also a function to detect that a potential of the secondary battery 101 has become lower than a predetermined potential from the battery voltage 113. More specifically, the voltage detection circuit 108 may detect that a charging amount of the secondary battery 101 becomes small (empty state), when the power is turned on, and has reached a value equal to or less than a predetermined voltage. In such a case, the voltage detection circuit 108 notifies the CPU 302 of the result. The CPU 302, upon receiving the notification, determines that the secondary battery 101 is in the empty state, and performs control to set a charging time to a maximum time and charge the secondary battery 101.

As previously described, when a temperature becomes higher than a certain level, a potential does not increase so much even in a fully-charged state, and it may become impossible to detect full charge state of the secondary battery 101 by the voltage detection circuit 108. In such a case, the CPU 302 calculates a required charging time from a device configuration (device electric power) and a discharging time (length of time from the preceding power-off) of the secondary battery. Then, the CPU 302 performs control to switch a charging method of the secondary battery from the continuous charging to the trickle charging, according to timer control based on the required charging time.

The charging control circuit 107 generates a signal (the charging control signal 111) for switching the constant-current circuit 102 to either the continuous charging or the trickle charging. The constant current circuit 102 needs to switch charging of the secondary battery 101 and thus operates on the continuous energization power source system 105. The charging control circuit 107 receives the charging scheme switching signal 112 from the voltage detection circuit 108, or the timer control 109, and generates the charging control signal 111 for switching to the continuous charging or the trickle charging.

A charging control circuit 107, upon receiving the charging scheme switching signal 112 from either the voltage detection circuit 108, or the timer control 109 (OR condition), switches from the continuous charging to the trickle charging.

The timer control 109 is a circuit which counts the time elapsed from the start of charging the secondary battery 101, and notifies that a predetermined time has elapsed. In the present exemplary embodiment, the timer control 109 is a module built in the CPU 302, but may be a chip or the like externally attached to the CPU 302. The timer control 109 outputs to the charging control circuit 107, the charging scheme switching signal 112 for switching from the continuous charging to the trickle charging, when the predetermined time has elapsed from the start of charging. In the present exemplary embodiment, the timer control 109 is configured to output the charging scheme switching signal 112 to the charging control circuit 107. However, the timer control 109 may notify that the predetermined time has elapsed to the CPU 302, and the CPU 302 may output the charging scheme switching signal 112 to the charging control circuit 107.

The apparatus power source control circuit 110 is a circuit which controls an output of the apparatus power source, and performs control to turn off the non-continuous energization power source system 106 in response to a signal from the CPU 302. The CPU 302, upon determining that a condition for shifting to the power-saving mode has been satisfied, controls a signal for turning off the non-continuous energization power source system 106, and outputs it to the apparatus power source control circuit 110.

Further, the apparatus power source control circuit 110 has a function of turning on the non-continuous energization power source system 106 based on an external factor such as incoming calls of a facsimile signal or an alarm signal from a timer 118. The non-volatile memory (SRAM) 117 stores a record of the time stamp by the timer control 109. The SRAM 117 and the timer 118 are supplied with power from the primary battery 119, and data of the SRAM 117 is retained even during power-off, and the timer 118 causes the timer function to operate even during power-off.

If the AC power source 104 is cut off, every power source supply from the apparatus power source 103 will be cut off. In this case, electric power supply to the load system 116 (e.g., a volatile memory (the RAM 301)) is automatically started through the backup power supply system 115 from the secondary battery 101. A diode 114 is a backflow prevention device arranged for preventing an electric current from flowing backward into a circuit at the front stage from the constant-current circuit 102 during backup operation.

Figure 6:
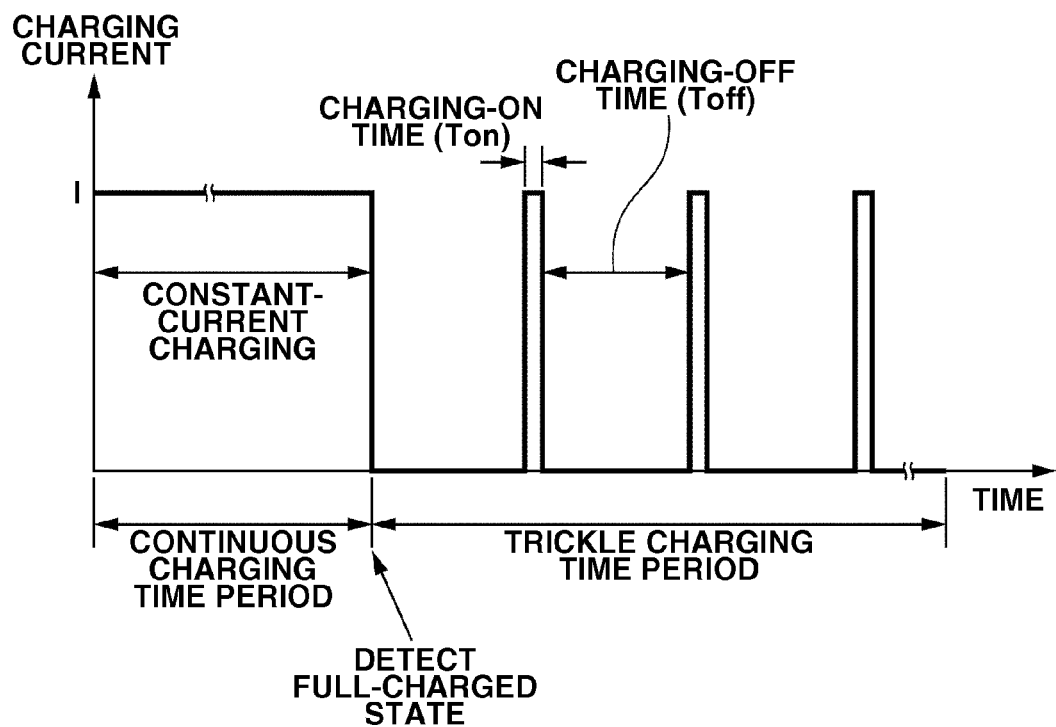
FIG. 6 is a view for explaining difference between charging currents during continuous charging and during trickle charging.

Next, the trickle charging will be described with reference to FIG. 6. The trickle charging, as described above, represents a charging which compensates for current capacity lowering caused by a self-discharge of the secondary battery 101, when the secondary battery 101 has become fully-charged by the continuous charging (or, has satisfied a condition almost equivalent to full-charge).

Hereinbelow, difference in charging currents between during the continuous charging and during the trickle charging will be described with reference to FIG. 6. Here, a pulse trickle charging which performs a pulse-like trickle charging will be described. FIG. 6 is a view for explaining difference in charging currents between during the continuous charging and during the trickle charging. As illustrated in FIG. 6, the charging circuit performs charging with a given current "I", until a full-charge of the secondary battery 101 is detected. On the other hand, after detection of the full-charge, the continuous charging is terminated, and the charging circuit performs charging to repeat alternately OFF time of a given period of time (Toff) and ON time of a given period of time (Ton). Ton and Toff, which vary depending on battery capacity, are designed based on such distribution to cause an electric current equivalent to a self-discharge amount per 24 hours (generally, about several percents of the battery capacity for nickel-hydrogen secondary battery) to flow through the secondary battery 101. Further, a relationship between charging ON time and OFF time is generally given by "Ton<<Toff".

Figure 7:
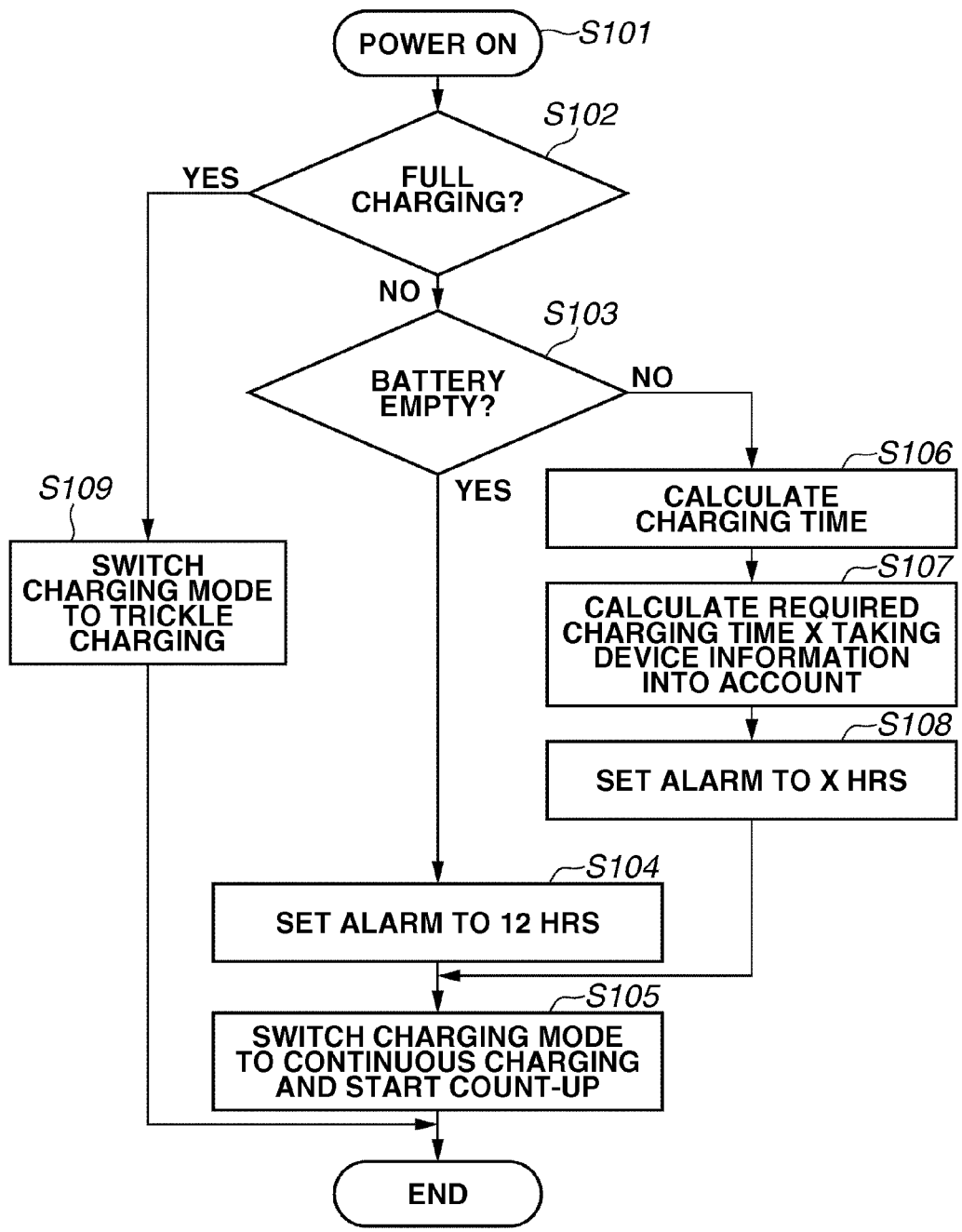
FIG. 7 is a flowchart illustrating a control during power-on in the first exemplary embodiment.

Hereinbelow, a control flow during power-on will be described with reference to FIG. 7. FIG. 7 is a flowchart illustrating a control during power-on in the first exemplary embodiment. In step S101, when power is turned on, a battery voltage of the secondary battery 101 is detected by the voltage detection circuit 108. If it is detected by the voltage detection circuit 108 that a charging amount of the secondary battery 101 has become equal to or greater than a specified amount (full-charge) (YES in step S102), then in step S109, the charging mode is switched to the trickle charging since it is only necessary to maintain the charging amount by the above-described trickle control. More specifically, the charging scheme switching signal 112 is output to the charging control circuit 107 from the voltage detection circuit 108, and the charging control signal 111 for switching the charging mode to the trickle charging is output from the charging control circuit 107 to the constant-current circuit 102. Accordingly, the charging mode is switched to the trickle charging, in the constant-current circuit 102.

If it is detected by the voltage detection circuit 108 that a charging amount of the secondary battery 101 has becomes equal to or smaller than a specified amount (empty state) (NO in step S102 and YES in step S103), a signal indicating the empty state is notified to the CPU 302. In step S104, upon receiving the notification, the CPU 302 determines that the secondary battery 101 is in the empty state, and sets a maximum time (12 hours in the present exemplary embodiment) during which the continuous charging is performed, for the timer control 109. Furthermore, in step S105, the CPU 302 performs control to switch the charging mode to the continuous charging, and enables the timer control 109 to start the count-up. More specifically, in switching between the charging modes, the CPU 302 outputs a signal for switching the charging modes to the continuous charging, to the charging control circuit 107. Accordingly, the charging control signal 111 for switching the charging mode to the continuous charging is output from the charging control circuit 107 to the constant current circuit 102. Accordingly, in the constant current circuit 102, the charging mode is switched to the continuous charging. If the charging mode is, already, in the continuous charging, at the time point of step S105, the continuous charging is continued as it is.

If the secondary battery 101 is neither in fully-charged state nor in the empty state (NO in step S102 and NO in step S103), neither a signal indicating the fully-charged state, nor a signal indicating the empty state is notified to the CPU 302 if power is turned on before discharging of a specified amount is completed. In this case, in step S106, the CPU 302 calculates a discharging time (a length of time from the previous power-off) using a current time-of-day read out from the timer 118 (as a time-of-day when charging of the secondary battery starts), and the time stamp stored in the SRAM 117. A calculation method of the discharging time (length of time from the previous power-off) will be described in detail with reference to the time stamp flow in FIG. 8.

Furthermore, the CPU 302 calculates a required charging time "X" by taking the discharging time obtained in the above step S106, and the device information into account. More specifically, in step S107, the CPU 302 acquires information of the device from the non-volatile memory on the RAM 301 or the ROM 303 or the like, and acquires the required charging time "X" from the table (FIG. 4) in which the information of the device and the discharging times obtained in step S106 are associated with each other. For example, in a case where the acquired information of the device is "8 pieces of DRAMs and 1 piece of other medium", and the discharging time is "70 min", "90 min" is acquired as the required charging time "X".

In the present embodiment, a "required charging time" has been acquired from the table in FIG. 4. However, a "total power consumption per unit time" corresponding to information of device may be acquired from the table in FIG. 4, and a "required charging time" "X" is calculated from the "total power consumption per unit time" and the "discharging time". For example, in a case where information of device is "12 pieces of DRAMs and 1 piece of other medium", "250 [mA]" of a "total power consumption per unit time" is acquired from the table FIG. 4. In a case where a discharging time is "70 min", a discharge capacity [mAh] is calculated as "250 [mA]×(70/60) [h]". Furthermore, in a case where a charging current value is "150 [mA]", a required charging time "X" is calculated as "discharge capacity/150"="(250× (70/60)/150" "1.94 [h]", that is, "117 min".

Next, in step S108, the CPU 302 sets a required charging time "X" as a length of time during which the continuous charging is performed, to the timer control 109. Furthermore, in step S105, the CPU 302 performs control to switch the charging mode to the continuous charging, and enables the timer control 109 to start the count up.

Figure 8:
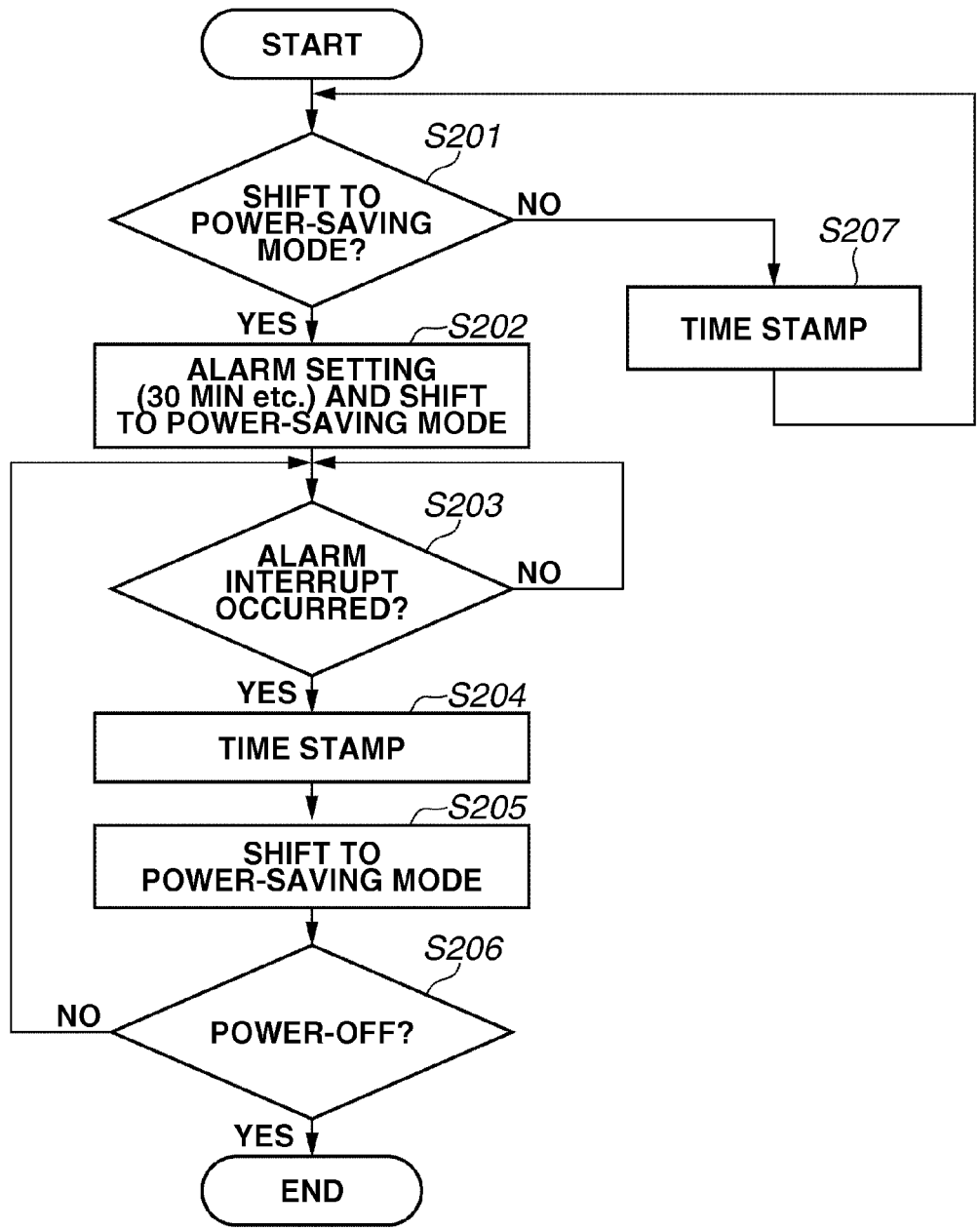
FIG. 8 is a flowchart illustrating a time stamp control in the first exemplary embodiment.

Hereinbelow, a time stamp control flow will be described with reference to FIG. 8. FIG. 8 is a flowchart illustrating the time stamp control in the first exemplary embodiment. In step S201, in a normal mode (which is not the power-saving mode), the CPU 302 determines whether to shift to the power-saving mode. If the CPU 302 determines not to shift to the power-saving mode (NO in step S201), then in step S207, the CPU 302 and the timer control 109 record the time stamps in the SRAM 117 at intervals of a predetermined period of time, and return the processing to step S201.

On the other hand, in the above step S201, if the CPU 302 determines to shift to the power-saving mode (YES in step S201), then in step S202, the CPU 302 sets an alarm (e.g., 30 min) to the timer 118, and enables the alarm function (ENABLE), to shift to the power-saving mode. The alarm setting may be performed in advance at the time of start-up, and the alarm function may be enabled (ENABLE) in the timing of step S202. When shifting to the power-saving mode, the CPU 302 outputs a signal for shutting off non-continuous energization to the apparatus power source 103 via the apparatus power source control circuit 110, and shuts off the non-continuous energization power source system 106.

The timer control 109 outputs an alarm signal every 30 minutes, and the signal is input into the apparatus power source 103 via the apparatus power source control circuit 110 (YES in step S203). The non-continuous energization power source system 106 is supplied to the CPU 302 in response to the alarm signal, and CPU 302 is activated. In step S204, the CPU 302 acquires time-of-day information from the timer control 109, and records the acquired time-of-day information in the SRAM 117 which is continuously supplied with power by the primary battery 119 (press the time stamp).

Upon completion of the predetermined processing, the CPU 302 outputs a signal for shutting off the non-continuous energization to the apparatus power source 103 via the apparatus power source control circuit 110, and shifts again to the power-saving mode. Then, when the alarm signal is output from the timer control 109 (YES in step S203), the above-described processing is repeated.

If power is turned off, or power feeding to power source is shut off due to power outage or the like (YES in step S206), a control for power-on time illustrated in FIG. 7 will be performed, when power is turned on at the next time. At this time, in step S106 in FIG. 7, the last time stamp pressed in step S204 in FIG. 8 is treated as a time-of-day of power-off, and CPU 302 can grasp a length of time during which power is off, in other words, a discharging time, by comparing between the time-of-day of the power-off and a time-of-day when power is turned on again.

Figure 9:
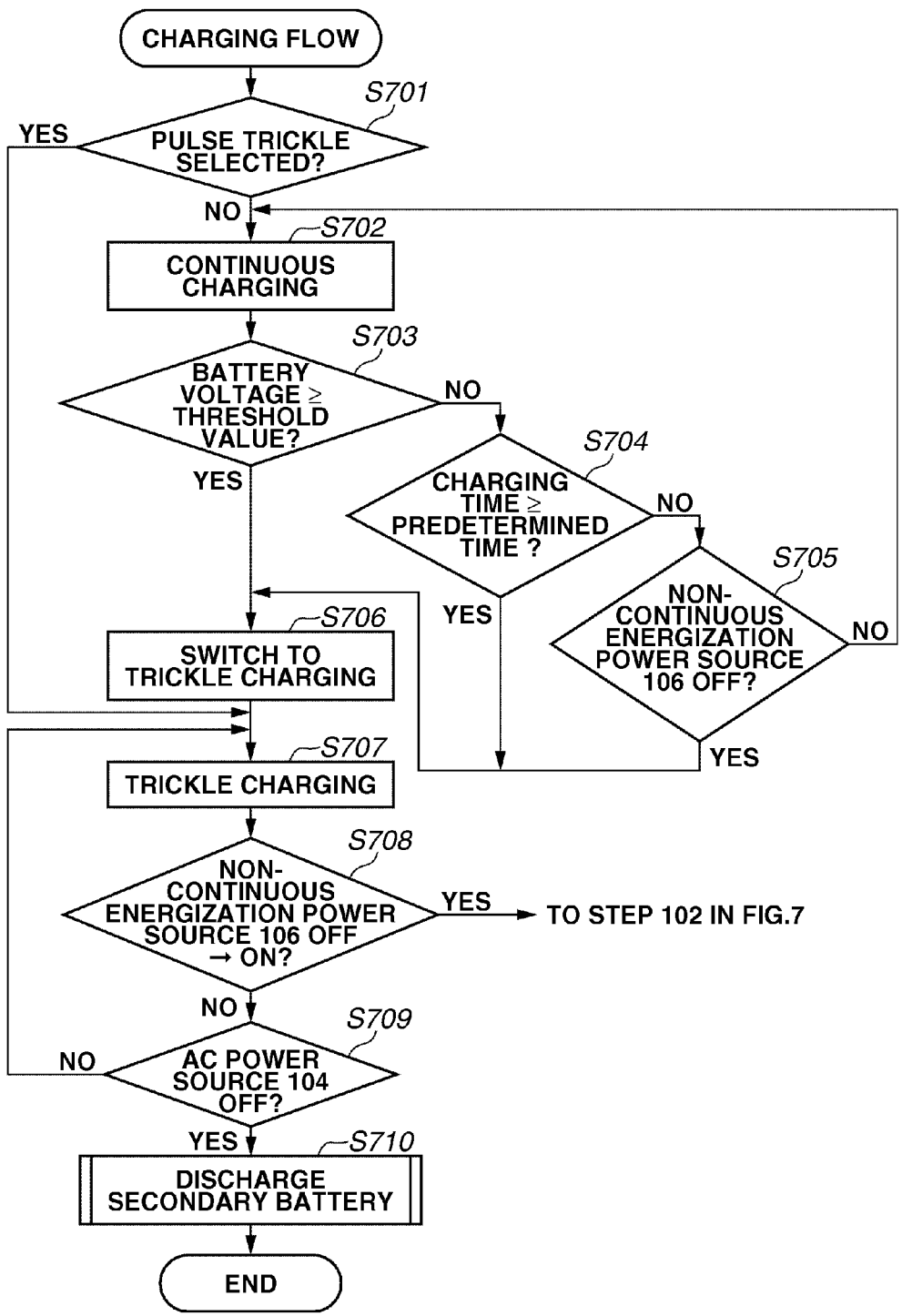
FIG. 9 is a flowchart illustrating a charging control in the first exemplary embodiment.

Hereinbelow, a control flow during charging will be described with reference to FIG. 9. FIG. 9 is a flowchart illustrating charging control in the first exemplary embodiment. As illustrated in FIG. 7, if the secondary battery 101 is in a fully-charged state, then in step S109, the trickle charging is selected as the charging mode. If the trickle charging is selected (YES in step S701), then in step S707, the constant current circuit 102 performs trickle charging of the secondary battery 101.

On the other hand, as illustrated in FIG. 7, if the secondary battery 101 is not in the fully-charged state, alarm is set to 12 hours (step S104 in FIG. 7) or "X" hours (in step S106 to step S108 in FIG. 7), and count-up is started, and the continuous charging is selected as the charging mode (in step S105 in FIG. 7). If the continuous charging is selected (NO in step S701), then in step S702, the constant current circuit 102 performs continuous charging of the secondary battery 101 (rapid constant-current charging).

In step S702 to step S706, during the continuous charging, if any one of the following respective conditions is satisfied, a charging scheme (charging mode) is switched to the trickle charging. If it is detected by the voltage detection circuit 108 that a charging amount of the secondary battery 101 has become equal to or greater than a preset voltage (threshold value) (full-charge) (YES in step S703), then in step S706, the charging scheme is switched to the trickle charging. Then in step S707, the trickle charging is performed. In this case, the charging scheme switching signal 112 is output to the charging control circuit 107 from voltage detection circuit 108, and the charging control signal 111 for switching the charging mode to the trickle charging is output from the charging control circuit 107 to the constant current circuit 102. Accordingly, in the constant current circuit 102, the charging mode is switched to the trickle charging.

If a charging time (count value of the timer control 109) has become equal to or greater than a preset time (time set in step S104 or in step S108 in FIG. 7) (YES in step S704), then in step S706, the charging scheme is switched to the trickle charging. Then, in step S707, the trickle charging is performed. In this case, the charging scheme switching signal 112 is output to the charging control circuit 107 from the timer control 109, and the charging control signal 111 for switching the charging mode to the trickle charging is output from the charging control circuit 107 to the constant current circuit 102. Then, in the constant-current circuit 102, the charging mode is switched to the trickle charging.

If the non-continuous energization power source system 106 is turned off by shifting to the power-saving mode (YES in step S705), then in step S706, the charging scheme is switched to the trickle charging. Then in step S707, the trickle charging is performed. In this case, the CPU 302, immediately before shifting to the power-saving mode, outputs the charging scheme switching signal 112 to the charging control circuit 107. Accordingly, the charging control signal 111 for switching the charging mode to the trickle charging is output from the charging control circuit 107 to the constant current circuit 102. In the constant current circuit 102, the charging mode is switched to the trickle charging.

If none of the conditions in the above step S703 to step S705 corresponds to the charging flow, then in step S702, continuous charging is continued. During the trickle charging, the constant-current circuit 102 maintains the secondary battery 101 in the fully-charged state, in preparation for unexpected cut-off of the AC power source 104. If the non-continuous energization power source system 106 is turned on, again, due to an external factor such as a facsimile reception or a LAN reception, or a user (YES in step S708), the control in step S102 to step S109 in FIG. 7 is performed. This is because, if switched to the trickle charging by turn-off of the non-continuous energization power source system 106, before the secondary battery 101 enters into the fully-charged state, the continuous charging is resumed aiming at full-charge, again, after the non-continuous power source system returns.

During the trickle charging, if the AC power source 104 is turned off (YES in step S709), then in step S710, discharge control is performed. In the discharge control, the RAM 301, which becomes a backup target by the secondary battery 101, is caused to shift to the self-refresh mode, and at almost the same time, electric power supply from the secondary battery 101 is started.

If a battery voltage is detected during discharging of the secondary battery 101, and the secondary battery 101 reaches a preset battery end voltage, the secondary battery is separated from a load system (the RAM 301 in the case of the exemplary embodiment), which is favorable for lifetime of battery or liquid leak prevention.

As illustrated above, in the first exemplary embodiment, even in the power-saving mode during which power is not fed to the CPU, a turn-off time of power can be calculated, by executing the time stamp utilizing the alarm function. Conventionally, the time when power is turned off could not be calculated in a case where power is turned off during the power-saving. Accordingly, even when power is turned off during the power-saving, a discharging time of the secondary battery can be also calculated.

Further, a table which enables the user to acquire a required charging time from configuration information (e.g., number of memories) of the load connected to the secondary battery and a length of time during which power was off (discharging time) is kept stored in the ROM or the like. Conventionally, when a charging target (e.g., a number of RAMs) is changed, a charging time could not be accurately calculated. However, by the configuration of the present invention, even when the charging target (e.g., a number of RAMs) is changed, the charging time of the secondary battery can be accurately calculated, and an overcharge of the secondary battery can be prevented.

Therefore, a charging time of the secondary battery incorporated as a power source for backup purposes into the apparatus in which even a power consumption of the control system (CPU or the like) is suppressed by shifting to the power-saving mode, can be accurately calculated, and thus an overcharge of the secondary battery can be prevented, without increase in costs and even when the charging target of the secondary battery is changed.

In the above-described first exemplary embodiment, an amount of electric charges discharged during power-off is calculated from a length of time during which power was off (discharging time) and a total power consumption per unit time of the load which receives power supply from the secondary battery, and a next charging amount is controlled based on the calculation result and the charging current value. More specifically, in the first exemplary embodiment, unless the charging current value is changed, a next charging amount will be calculated from only a discharging amount during the preceding power-off. However, when the next charging amount is calculated from only the discharging amount during the previous power-off, a problem still remains as a defective point in the following two patterns, though rare in their frequency.

The first one is a case where power-off and power-on are performed two or more times in a short time, and the second one is a case where power outage state occurs two or more times in a short time. Now, as a further improvement, a method for controlling a next charging amount from cumulative amounts of the past charging amount and the discharging amount will be described as a second exemplary embodiment. Hereinbelow, a characteristic configuration of a charging control method according to the second exemplary embodiment for determining a next charging amount based on accumulations of charging and discharging will be described with reference to FIG. 10 and FIG. 11. FIG. 10 is a flowchart illustrating a control during power-on in the second exemplary embodiment. In step S801 in FIG. 10A, when power is turned on, a battery voltage of the secondary battery 101 is detected by the voltage detection circuit 108. If it is detected by the voltage detection circuit 108 that a charging amount of the secondary battery 101 has become equal to or greater than a specified amount (full-charge) (YES in step S802), then in step S815, the charging mode is switched to the trickle charging since it is only necessary to maintain the charging amount by the above-described trickle control. More specifically, the charging scheme switching signal 112 is output to the charging control circuit 107 from the voltage detection circuit 108, and the charging control signal 111 for switching the charging mode to the trickle charging is output from the charging control circuit 107 to the constant current circuit 102. Accordingly, in the constant current circuit 102, the charging mode is switched to the trickle charging.

If it is detected by the voltage detection circuit 108 that a charging amount of the secondary battery 101 has become equal to or smaller than a specified amount (empty state) (NO in step S802 and YES in step S803), a signal indicating the empty state is notified to the CPU 302. Upon receiving the notification, the CPU 302 determines that the secondary battery 101 is in the empty state. In step S814, the CPU 302 defines the required charging time "X" as a maximum charging time which is a maximum time in which continuous charging is performed (12 hours in the present exemplary embodiment), and advances the processing to step S810.

In step S810, the CPU 302 sets the required charging time "X" to the timer control 109. In step S811, the CPU 302 performs control to switch the charging mode to the continuous charging, and enables the timer control 109 to start the count-up. More specifically, in switching the charging mode, the CPU 302 outputs to the charging control circuit 107 a signal for switching the charging mode to the continuous charging. Accordingly, the charging control signal 111 for switching the charging mode to the continuous charging is output from the charging control circuit 107 to the constant-current circuit 102. Thus, in the constant current circuit 102, the charging mode is switched to the continuous charging. At a time point of step S811, if the charging mode is already set to the continuous charging, the continuous charging is continued as it is. The CPU 302 records the timing in step S810 in the SRAM 117 as a continuous charging starting time.

If the secondary battery 101 is neither in the fully-charged state nor in the empty state (NO in step S802 and NO in step S803), when power is turned on again before the specified amount of discharging is completed, neither a signal indicating the fully-charged state, nor a signal indicating the empty state is notified to the CPU 302. In this case, in step S804, the CPU 302 calculates a full-charge flag.

Here, calculation processing of the full-charge flag in step S804 will be described with reference to FIG. 10B. First, in step S821 in FIG. 10B, the CPU 302 acquires a charging time "X" during which the battery should be charged. The charging time "X'" during which the battery should be charged, is acquired by the CPU 302 reading out a required charging time "X" hours set to the timer control 109 in step S810 in FIG. 10A from the non-volatile SRAM 117. If the required charging time "X" hours is not stored in the non-volatile SRAM 117, a maximum charging time which is a maximum time during which continuous charging is performed (12 hours in the present exemplary embodiment) is determined to be the charging time "X'" during which the battery should be charged.

Next, in step S823, the CPU 302 calculates the previous continuous charging time "t" from the preceding continuous charging starting time stored in the non-volatile SRAM 117 and the time stamp (power-off time). The previous continuous charging starting time, as described above, is the one stored in the SRAM 117, but if it is not recorded in the SRAM 117, the previous continuous charging time "t" is set to "0". A relationship between the charging time "X'", the continuous charging time "t", and power-off time (discharging time) "T" is illustrated in FIG. 11.

Figure 11:
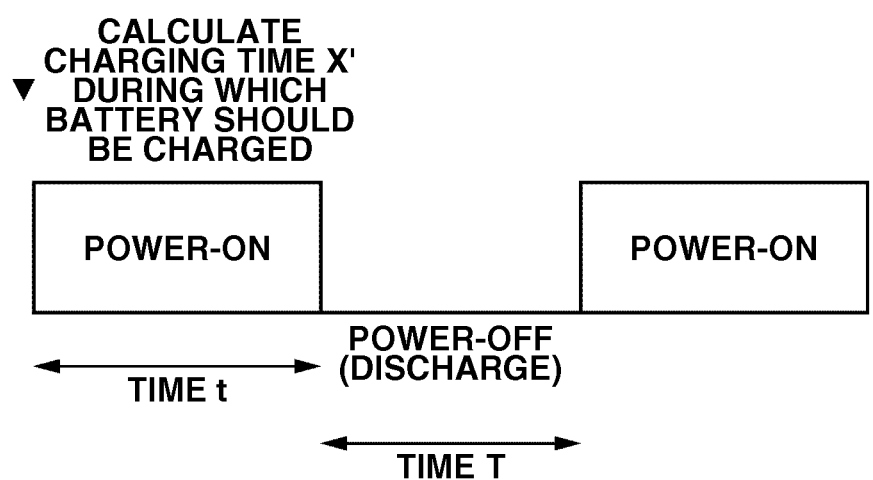
FIG. 11 is a view for explaining a charging time "X" during which the secondary battery should be charged, a charging time "t", a power-off time "T".

FIG. 11 is a view for explaining the charging time "X'" during which the battery should be charged, the continuous charging time "t", and the power-off time "T". Next, in step S803, the CPU 302 calculates in the following procedure a full-charge flag which indicates whether charging has been executed by the time "X'" during which the battery should be charged, at the previous time. If $X'-r \leq 0$, more specifically, if a subtraction value obtained by subtracting the charging time during which the battery was actually charged at the previous time from the charging time determined at the previous time is negative or zero, it is determined that the battery was fully-charged at the time of the previous charging, and the full-charge flag is set (full-charge flag=1).

If $X'-t>0$, more specifically, if a subtraction value obtained by subtracting the charging time during which the battery was actually charged at the previous time from the charging time determined at the previous time is positive, it is determined that power has been turned off before the battery is fully-charged at the time of the preceding charging, and the full-charge flag is turned off (full-charge flag=0).

For example, when the time "X" during which the battery should be charged is 4 hours, and the continuous charging time "t" is 1 hour, 4 hours−1 hour=3 hours>0, and the secondary battery during power-off is not in fully-charged state. At this time, similarly to the first exemplary embodiment, if the required charging time is calculated simply based on the power-off time (discharging time), the required charging time "X" becomes 1 hour, and even if charging for the required charging time "X" is performed, such a situation occurs that the secondary battery 101 does not become fully charged.

Therefore, in this case, in consideration of the fact that a charging amount of 4−1=3 hours is insufficient relative to the full-charge (in consideration of insufficient charging time of "3 hours"), it is necessary to calculate the next charging time (the required charging time).

Now, referring back to FIG. 10A, in step S804, if calculation of the full-charge flag is completed, then in step S805, the CPU 302 determines whether the full-charge flag is "1". In step S805, if it is determined that the full-charge flag is set (YES in step S805), then in step S812, the CPU 302 obtains the previous off-time (discharging time "T") by a method according to the first exemplary embodiment. Next, in step S813, the CPU 302 obtains the required charging time "X" from the discharging time obtained in the above step S812, and the device information by a method according to the first exemplary embodiment. For example, the CPU 302 acquires information of device from the non-volatile memory or the like configured on the RAM 301, and acquires necessary charging amount, in other words, the required charging time "X" from the table in FIG. 4 in which the acquired information of the device and the discharging time obtained in step S812 are associated with each other. Then, the CPU 302 advances the processing to step S810.

In step S810, as described above, the CPU 302 sets the required charging time "X" to the timer control 109. Then, in step S811, the CPU 302 performs control to switch the charging mode to the continuous charging, and enables the timer control 109 to start the count-up.

On the other hand, in the above step S805, if the CPU 302 determines that the full-charge flag is not set (NO in step S805), the CPU 302 determines that a charging amount of the secondary battery 101 at the moment when power is turned off is not full-charge, and advances the processing to step S806.

In step S806, the CPU 302 calculates insufficient charging time "Y" which has been charged until immediately before power is turned off at the previous time from "X'−t". Furthermore, in step S807, the CPU 302 obtains a time during which power was off at the previous time (discharging time "T") by a method according to the first exemplary embodiment. Next, in step S808, the CPU 302 obtains a charging time (discharging amount charging time) "Z" for compensating for the discharging amount during the discharging time "T" obtained in the above step S807, from the discharging time "T" and the information of device. For example, the CPU 302 acquires information of device from the non-volatile memory on the RAM 301 or the ROM 303 or the like, and acquires a charging amount corresponding to the acquired information of the device and the discharging time "T" obtained in step S807 as the discharging amount charging time "Z", from the table in FIG. 4. For example, in a case where the information of device is "12 pieces of DRAMs and 1 piece of other medium" and the discharging time is "20 min", "50 min" is acquired as the discharging amount charging time "Z". Then, the CPU 302 advances the processing to step S810.

In step S809, as described above, the CPU 302 calculates the required charging time "X" from 'insufficient charging time "Y"+discharging amount charging time "Z"'. An upper limit of the required charging time "X" is assumed to be 12 hours. Furthermore, in step S810, the CPU 302 sets the required charging time "X" to the timer control 109. In step S811, the CPU 302 performs control to switch the charging mode to the continuous charging, and enables the timer control 109 to start the count-up.

When the next charging amount is determined based on only off-time (discharging time), in a case where immediately before power is turned off at the previous time the battery is not in a full-charge state, error will occur in a charging amount which should be charged, if power-off/power-on was performed in a short period of time (before the secondary battery is fully-charged), for example. In the present second exemplary embodiment, even if power is turned off before the secondary battery becomes fully charged, charging control of the secondary battery can be performed in consideration of errors of the above-described charging amount, by referring to charging history, when power is turned on again, and thus the above-described problems can be solved.

Structures of various types of data and contents thereof described above are not limited to the described ones, and the exemplary embodiments of the present invention are configured by various configurations and contents depending on intended uses and purposes. So far, one exemplary embodiment has been illustrated, but the present invention can include embodiments, for example, as a system, an apparatus, a method, a program or a storage medium. More specifically, the present invention may be applied to a system composed of a plurality of devices, or may be applied to an apparatus composed of single device.

Further, configurations that combine the above-described respective exemplary embodiments are all included in the present invention. Further, the present invention may be applied to a system composed of a plurality of devices, or may be applied to an apparatus composed of single device. The present invention is not limited to the above-described exemplary embodiments, and different variations (including an organic combination of respective exemplary embodiments) are possible based on the spirit of the present invention, and the present invention is not intended to exclude these from the scope of the present invention. In other words, the above-described respective exemplary embodiments and configurations which are the combinations of their variations are all included in the present invention.

As described above, a discharging amount or the like of the secondary battery during power-off can be predicted from a power consumption of a device (load) such as a memory structure which receives power supply from the secondary battery and a time during which power is off, and occurrence of an overcharge state of the secondary battery can be prevented. Further, a charging amount during the next power-on is determined based on predictions of a charging amount (or insufficient charging) during the previous power-on, and a discharging amount of the battery during power-off. By this configuration, even if electric power supply from the outside is cut off before the secondary battery is fully charged, the secondary battery can be sufficiently charged when electric power supply is resumed, and overcharge state can be also prevented.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-140848 filed Jun. 21, 2010, which is hereby incorporated by reference herein in its entirety.

What is claimed is:

1. An information processing apparatus capable of installing a plurality of storage units, the information processing apparatus comprising:
   a first supply unit configured to supply electric power to the plurality of storage units;
   a second supply unit configured to supply electric power to the plurality of storage units, when the first supply unit stops supplying electric power to the plurality of storage units;
   a charging unit configured to charge the second supply unit;
   a measurement unit configured to measure a time during which the second supply unit supplies electric power to the plurality of storage units;
   a detection unit configured to detect a number of the storage units installed on the information processing apparatus;
   a determination unit configured to determine a time during which the second supply unit should be charged, based on the time which has been measured by the measurement unit and the number of units which has been detected by the detection unit; and
   a control unit configured to perform control that the charging unit charges the second supply unit for a period of the time which has been determined by the determination unit.

2. The information processing apparatus according to claim 1, wherein the determination unit determines a time during which the second supply unit should be charged, by multiplying the time which has been measured by the measurement unit, by the number of units which has been detected by the detection unit.

3. The information processing apparatus according to claim 1, further comprising:
   a retention unit configured to retain a time during which the second supply unit should be charged, for each combination of a time during which the second supply unit has supplied electric power to the plurality of storage units and a number of the storage units installed on the information processing apparatus, in association with the combination, wherein the determination unit determines a time during which the second supply unit should be charged, by identifying a time corresponding to the combination of the time which have been measured by the measurement unit and the number of units which has been detected by the detection unit, from among the times retained in the retention unit.

4. The information processing apparatus according to claim 1, wherein determination unit determines a time during which the second supply unit should be charged, based on a subtraction value obtained by subtracting a previous charging time from a previously determined time, and a this time determined time.

5. The information processing apparatus according to claim 4, wherein the determination unit, if the subtraction value obtained by subtracting the previous charging time from the previously determined time is negative, determines a maximum charging time of the second supply unit, as a time during which the second supply unit should be charged, and if the subtraction value obtained by subtracting the previous charging time from the previously determined time is positive, determines a time during which the second supply unit should be charged, by adding the this time determined time to the subtraction value obtained by subtracting the previous charging time from the previously determined time.

6. The information processing apparatus according to claim 1, wherein the control unit performs control that the charging unit executes charging equivalent to a self-discharge of the second supply unit, at predetermined time intervals, after the charging unit has charged the second supply unit for the period of the time which has been determined by the determination unit.

* * * * *